G. F. WENNAGEL.
DISSIPATING HEAT FROM UNDERGROUND CONDUITS.
APPLICATION FILED AUG. 11, 1916, RENEWED APR. 2, 1919.
1,307,070.
Patented June 17, 1919.
2 SHEETS—SHEET 1.
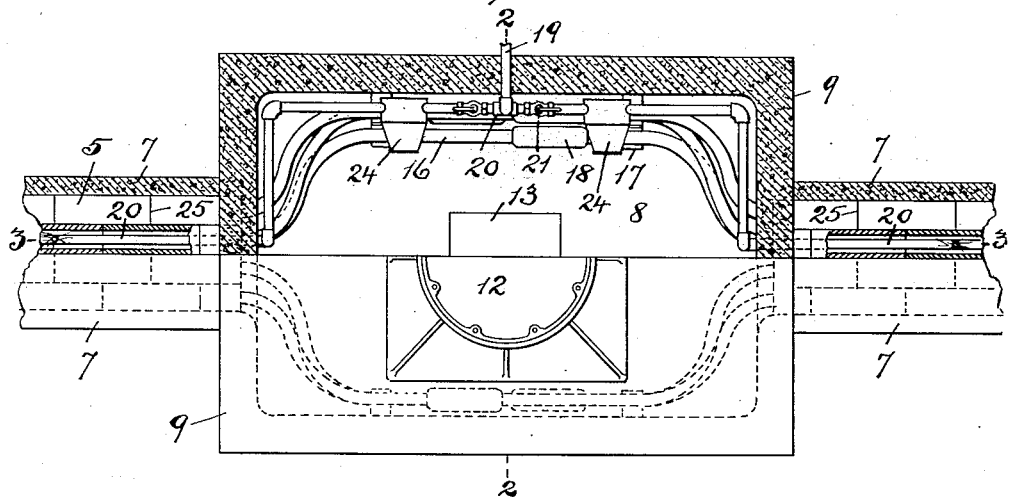
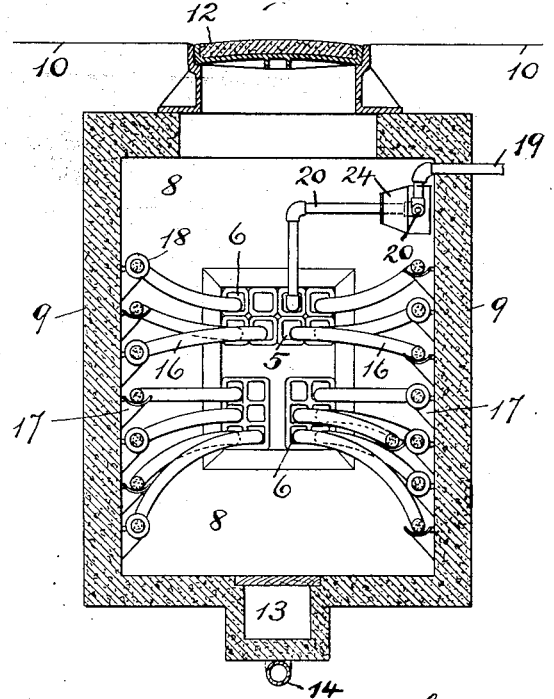

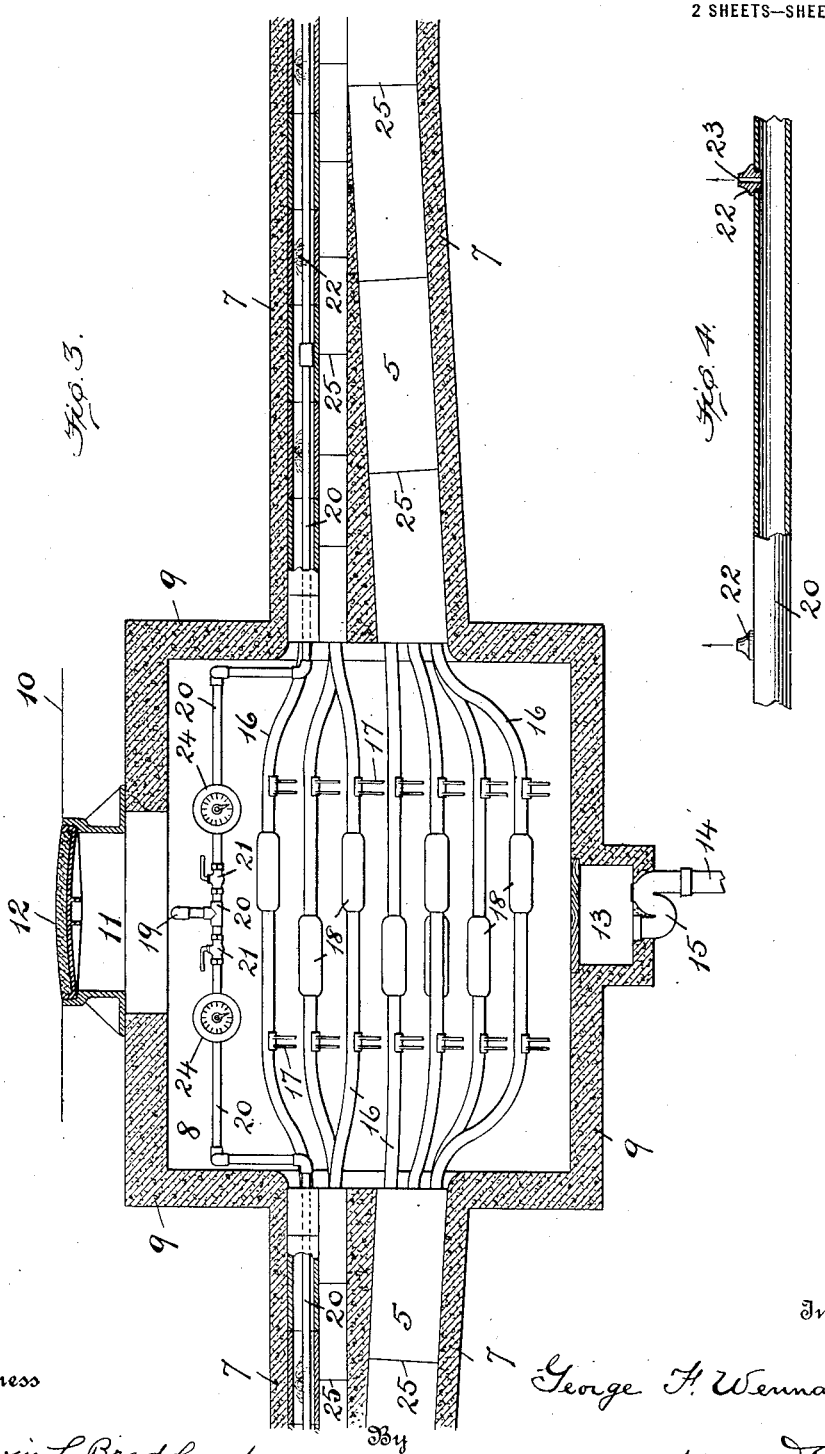

UNITED STATES PATENT OFFICE.

GEORGE F. WENNAGEL, OF BALTIMORE, MARYLAND.

DISSIPATING HEAT FROM UNDERGROUND CONDUITS.

1,307,070.   Specification of Letters Patent.   Patented June 17, 1919.

Application filed August 11, 1916, Serial No. 114,324. Renewed April 2, 1919. Serial No. 287,098.

*To all whom it may concern:*

Be it known that I, GEORGE F. WENNAGEL, a citizen of the United States, residing at Baltimore city, in the State of Maryland, have invented certain new and useful Improvements in Dissipating Heat from Underground Conduits, of which the following is a specification.

This invention relates to a method and means for cooling electric conductor cables in underground conduits.

It is well known that the insulating materials constituting the dielectrics in certain classes of electric conductor cables, used in underground conduits, are unable to withstand high temperatures without undergoing serious deterioration, and that, unless conditions be favorable to a free and rapid dissipation of the heat generated through the conversion of the energy lost in overcoming the resistance of the conductors, and also by certain dielectric losses, cables inclosed in the ducts of an underground conduit are liable to reach and do reach critical temperatures at which the insulation is so seriously impaired as to be unable to withstand the voltage stress and ruptures of the dielectrics ultimately ensue. The overheating of duct lines, due to the accumulation of the heat generated by the cables therein, is dependent upon a number of factors, the most important being briefly as follows: The composition of the ducts, the arrangement of the ducts relative to one another, the relative positions of the cables, and the nature of the surrounding medium. The ability of the medium surrounding the conduits and the cables to conduct heat is a serious consideration, inasmuch as with the same current a cable might be comparatively cool if laid in good heat conducting material, such as water or moist earth, and dangerously hot if surrounded by poor heat conducting material, such as dry sand or cinders. From these facts it is obvious that, where the dissipation of heat from duct lines is retarded to any extent, the carrying capacities of cables inclosed therein must be proportionately reduced, sometimes at considerable expense, if such failures as described, and the resultant interruptions to service, are to be prevented.

It is, therefore, an object of the present invention to provide a method for producing, artificially, conditions most favorable to rapid heat dissipation from underground conduits which inclose electric conductor cables, in order that the cables may be operated safely and efficiently at, or near, their full rated capacities without exceeding their safe working temperatures. Another object of the invention is to provide a means for applying the aforesaid method to underground conduit-cable systems in a practical and efficient manner, at relatively low cost, and in a way that does not necessitate any alterations in the conduit structures or the tearing up of paved streets and roadways.

The invention is illustrated in the accompanying drawings, in which—

Figure 1 is a plan view, partly in section on a plane parallel with the ground surface, showing underground conduits entering the opposite ends of a manhole chamber. In the half of the figure in section an interior view of the manhole and the equipment therein are shown, and one of the duct chambers on each end has been partly broken out in order to show more clearly the improvement therein.

Fig. 2 is a vertical cross section on the line 2—2 of Fig. 1.

Fig. 3 is a vertical, central, longitudinal section on the line 3—3 of Fig 1.

Fig. 4 is a detail view, partly in section, showing a piece of tube or pipe having orifices at intervals along its length for the discharge of water.

In all of the above views corresponding parts are represented by the same numerals of reference.

Due to the nature of my invention and the manner in which it is applied, attention is directed first to a detail description of a typical underground conduit and the electrical equipment therein, as shown in the accompanying drawings.

The numeral 5 designates an ordinary underground conduit, and 6 the ducts or passageways in said conduit. The conduit sections 5 are usually completely enveloped in a shell 7 of concrete, or other protective cover, embedded in the earth. At proper intervals, access to the conduits is made possible by manhole chambers 8, the walls 9 of which are generally constructed of bricks or concrete. Entrance to the chamber 8 is made through the opening 11, which is flush with the ground surface 10 and is closed by means of a suitable cover plate 12. To dispose of any water that may drain into the manholes from various sources, the bottom of chamber 8 has a sump or depression 13 from which pipe 14, equipped with a trap 15, connects to a sewer (not shown) or leads directly into the earth. Cables 16, which consist of insulated electric conductors incased in watertight jackets, usually of lead, to exclude moisture, extend through the ducts 6 to the manhole chamber 8 where they are supported by brackets or racks 17 attached to the walls 9. The numeral 18 designates joints or splices which unite the ends of the cable sections and make the cables continuous. To relieve cable congestion in the manhole chambers where the cables enter, the ducts are sometimes separated by running some of them on a slight incline as they approach the chamber, as shown in Fig. 3.

In the invention herein disclosed, the method provided for accelerating the dissipation of heat generated by electric cables in underground conduits consists of the artificial introduction of cooling water into the ducts of conduit lines in such a manner as to cause it to come in contact with the cables and also to moisten the medium surrounding the conduits to such an extent as to greatly increase its heat conducting properties. The presence of water around the cables has no detrimental or injurious effect and does not interfere in any way with their proper functions, inasmuch as cables used for such purposes are always thoroughly protected against moisture by water-proof incasements, as previously described. Any preferred means may be employed to cause water, under control, to enter a duct, or ducts, of an underground conduit system for the purpose of effecting a cooling thereof and of the equipment therein.

In the present invention, the means adopted for applying this method consists of a pipe or tube 20 installed, preferably, in one of the uppermost central vacant ducts, as shown, and said pipe provided at intervals along its length with a number of small holes or orifices 23 from which water is sprayed or discharged into the conduit, the said tube or pipe 20 being connected with a source of water supply by the pipe 19 which enters the manhole chamber 8 through the wall 9 and connects to the distributing branches 20, 20 through the valves 21, 21, which serve to control and regulate the flow of water, and through the meters 24, 24, which measure the flow.

The water, after being sprayed into the conduit, preferably into one of the top ducts therein, as explained, percolates through the joints 25 between the different conduit sections and thereby not only effects a cooling of the cables in the various ducts by getting in actual contact with the protective lead sheathings, but performs an equally desirable and beneficial function by wetting the earth or other medium surrounding the conduit, after passing through the pores of the thin concrete shell 7.

To prevent the discharge holes or orifices 23 from becoming closed through oxidation, as would be liable to occur if they were drilled through the walls of iron pipe, I have provided nipples or plugs 22 made of a non-corrodible metal and bored with the proper sized orifices 23. These plugs have threaded shanks and are screwed into tapped holes in the pipe or tube, 20, leaving the discharge ends projecting.

From the foregoing description the nature of my invention, the manner in which it is applied, and the mode of its operation will be understood.

Having now described my invention, what I claim and desire to secure by Letters Patent is as follows:

1. In an electric cable system, the combination with a structure forming a man-hole chamber, of conduits opening into the man-hole chamber said conduits having a series of ducts therein; cables extending through said ducts and into the man-hole chamber said cables being insulated with a material against the action of moisture but subject to variations in temperature; a pipe extending through a duct of said conduit and permanently carried therein said pipe having a series of outlets along its length, and means for supplying a cooling fluid to said permanent pipe to be discharged from said outlets into the duct through which the pipe extends.

2. In an electric cable system, the combination with a structure forming a man-hole chamber, of conduits opening into said manhole chamber said conduits being formed in sections and each section having a series of ducts,—the ducts of one section being in alinement with the ducts of the next section; cables extending through the ducts of the conduit sections said cables being insulated against moisture but subject to variations in temperature; a pipe extending through the conduit sections and having outlets which opens into said sections; means for supplying a cooling fluid to said pipe to be liberated at spaced intervals in the conduit sections said cooling fluid moistening the ducts and the surfaces around the cables to dissipate the heat.

3. In an underground electric cable system, the combination with a series of spaced-apart structures forming man-hole chambers, of underground conduits extending from one man-hole chamber to another, said conduits being formed in sections and each section having a series of ducts which aline with a similar series of ducts in the next section; electric cables extending through the ducts from one man-hole chamber to another said cables being insulated against moisture but subject to variations in temperature; a pipe extending through the conduit sections from one man-hole chamber to another said pipe having a series of outlets between one man-hole chamber and the next man-hole chamber; means for continuously supplying water to said pipe for liberation in the conduit sections at spaced apart intervals said water permeating through the ducts and moistening the medium surrounding the insulated cables.

In testimony whereof I affix my signature in the presence of two witnesses.

GEORGE F. WENNAGEL.

Witnesses:
JOHN W. NICOL, Jr.,
CHARLES B. MANN, Jr.